Figure 1:
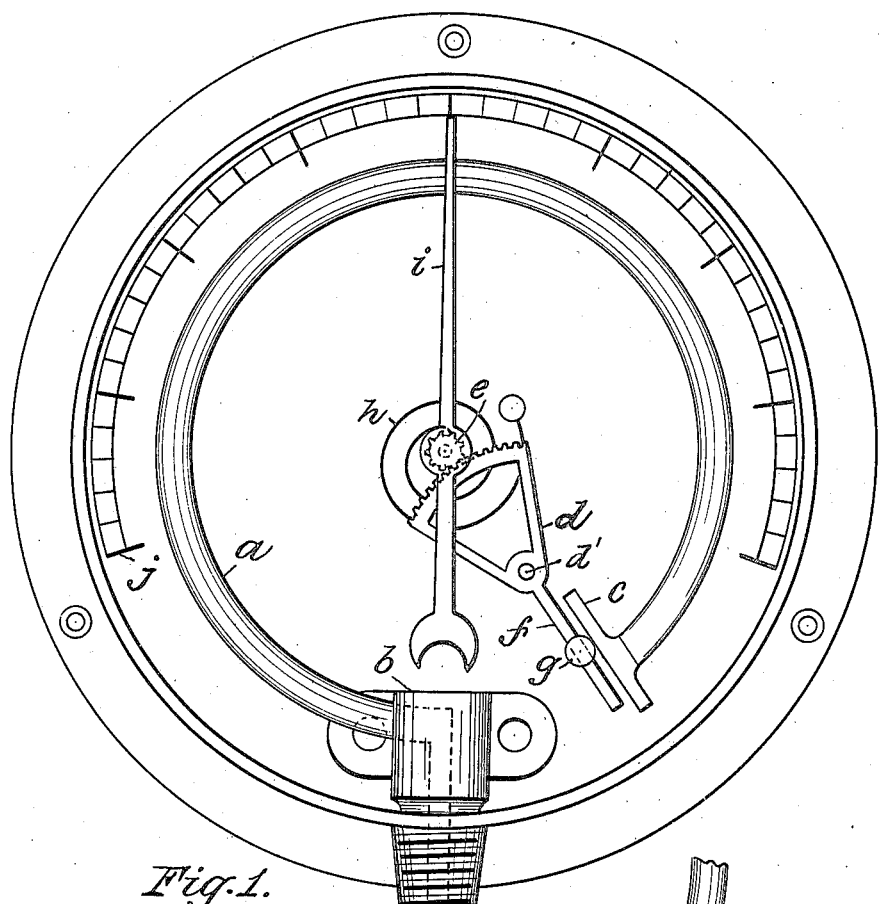

A. O. BENECKE.
PRESSURE GAGE.
APPLICATION FILED OCT. 8, 1910.

1,070,392.

Patented Aug. 19, 1913.
2 SHEETS—SHEET 1.

WITNESSES:
C. A. Alliston
Edward G. Gitt

INVENTOR
Adelbert O. Benecke
BY Frak C. Fischer
ATTORNEY

A. O. BENECKE.
PRESSURE GAGE.
APPLICATION FILED OCT. 8, 1910.

1,070,392.

Patented Aug. 19, 1913.
2 SHEETS—SHEET 2.

WITNESSES:

INVENTOR
Adelbert O. Benecke
BY
Fredk C. Fischer
ATTORNEY

UNITED STATES PATENT OFFICE.

ADELBERT O. BENECKE, OF FOXBORO, MASSACHUSETTS.

PRESSURE-GAGE.

1,070,392.

Specification of Letters Patent. Patented Aug. 19, 1913.

Application filed October 8, 1910. Serial No. 585,923.

*To all whom it may concern:*

Be it known that I, ADELBERT O. BENECKE, a citizen of the United States, residing at Foxboro, in the county of Norfolk and State of Massachusetts, have invented certain new and useful Improvements in Pressure-Gages, of which the following is a full, clear, and exact description, such as will enable others skilled in the art to which it pertains to make, construct, and use the same, reference being had to the accompanying drawings, and to letters of reference marked thereon, forming a part of this specification.

My invention relates to pressure gages employing a Bourdon-tube spring and more particularly to the means employed whereby the movement of the free end of the tube-spring is transmitted to the multiplying and indicating member of the gage.

Heretofore in the construction of pressure gages of the type to which my invention relates, it has been customary to connect a member of the indexing mechanism to the Bourdon-tube spring by a pivoted link, in such a manner that the movement of this member, in either direction, is caused by a direct push or pull of the link by which the same is connected to the free end of the Bourdon-tube spring. Such an arrangement introduces a great deal of friction and lost motion, seriously interfering with the accuracy of the indications of the gage. This can readily be understood by considering that the path described by that point of the link which is connected to the free end of the Bourdon-tube spring is quite different from the path described by that point of the link which is connected to the member of the indexing mechanism; and that furthermore, the plane in which the free end of the Bourdon-tube spring moves, can hardly be expected to be perpendicular to the axis of said member.

My invention has for its object, to provide a pressure gage which is not open to the objections above referred to, and I accomplish my object by so arranging the multiplying device that it works independently of the Bourdon-tube spring, except that the position of the free end of the spring determines the extent of travel of the pointer. The shaft which carries the pointer is actuated upon by a hair-spring or any other suitable device, in such a manner that it tends to revolve in one direction, thus turning a sector of a gear wheel or a lever until an arm connected to the same comes in contact with the free end of the the Bourdon-tube spring.

A preferred construction of a pressure gage embodying my invention is shown in the accompanying drawings, in which—

Figure 2:
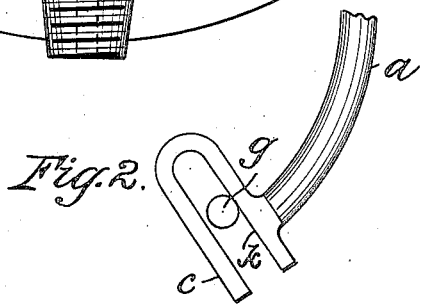
Figure 3:
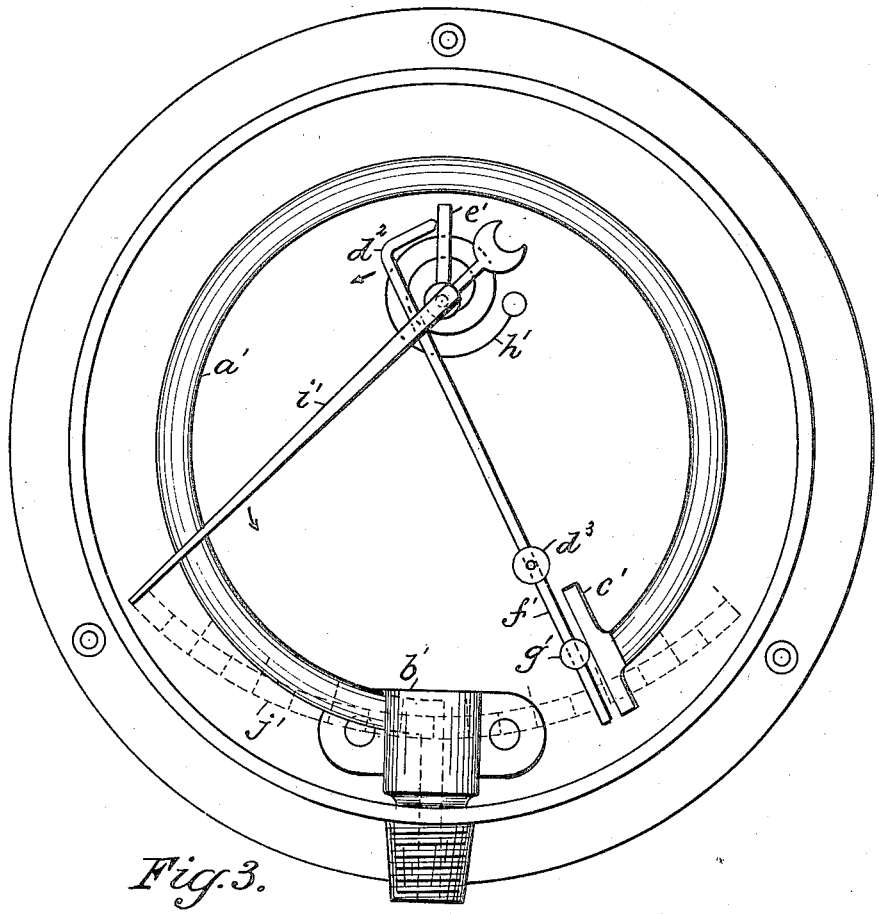

Figure 1 represents a front elevation of a pressure gage, the movement supporting bracket being removed to show the mechanism. Fig. 2 represents a fragmentary view of the free end of the Bourdon-tube spring having secured thereto a slotted terminal, in which slides a pin adjustably secured to an arm of the multiplying and indexing mechanism; and Fig. 3 represents a front elevation of a modified form of my improved pressure gage, the movement supporting bracket being removed to show the mechanism.

Similar letters of reference refer to like parts throughout the specification and drawings.

The Bourdon-tube spring $a$ has its inner end affixed to the socket $b$, and to its free outer end is attached a suitable terminal $c$. The sector $d$ pivoted at $d'$ together with the pinion $e$ constitutes the multiplying device secured in any convenient manner to a movement supporting bracket common in pressure gages (not shown), and has preferably an integral arm $f$ extending therefrom, to which is adjustably secured the pin $g$ which bears against and has sliding engagement with the terminal $c$ without being in any way connected to the same. The tension of the hair-spring $h$ which actuates the pinion $e$ and pointer $i$ tends to hold the pin $g$ against the terminal $c$, which pin thus follows the movement of the terminal $c$ and transmits the same to the pointer $i$ which moves over the scale $j$.

Inasmuch as the pin $g$ is made to slide on and is therefore adjustable along the arm $f$, the motion of the terminal $c$ may be more or less multiplied, thus lengthening or shortening the scale $j$. I prefer to provide the terminal $c$ with a slot $k$, as illustrated in Fig. 2, in which the pin $g$ is loosely fitted, thus preventing the pointer $i$ from oscillating through too wide an angle, in case of large and sudden changes in pressure.

In Fig. 3 of the drawings, I have shown a modified form of my improved pressure gage, the operation and principle of which is identical with the structure shown in Fig. 1, with the exception that instead of employing a sector and a pinion, I substitute therefor levers. Gages are sometimes made with scales not exceeding 90° in angle, and in such instruments, I find it desirable to employ the construction shown in Fig. 3, in which $a'$ represents the Bourdon-tube spring having its inner end affixed to the socket $b'$, and to its free outer end is attached the terminal $c'$. Instead of employing the sector $d$ and the pinion $e$, I substitute therefor the lever $d^2$, and the lever $e'$. The hair spring $h'$ tends to move the pointer $i'$ in the direction indicated by the arrow, owing to the fact that the lever $e'$ moves with and is secured to the pointer $i'$, thereby causing the lever $e'$ to contact with the lever $d^2$ at its upper end, moving it in the direction indicated by the arrow and turning it around the pivot $d^3$, keeping the adjustable pin $g'$ located on the extension $f'$ of the lever $d^2$ in contact with the terminal $c'$ of the Bourdon-tube spring, until pressure is applied to the Bourdon-tube spring, in which case, the same opens, and the index $i'$ will travel over the scale $j'$ with the adjustable pin $g'$ in contact with the terminal $c'$.

The present invention provides a very simple and exceedingly efficient pressure gage, the specific feature of which differs from all others in the arrangement of the multiplying mechanism, in that it is not rigidly connected to the Bourdon-tube spring, and therefore works independently of the same, and that the position of the free end of the spring determines the extent of the travel of the pointer, thereby reducing friction and lost motion to a minimum.

It will be readily understood that in case the Bourdon-tube spring does not move in a plane exactly perpendicularly to the axis of the sector, considerable friction in the bearings of the sector shaft will result when the sector is connected in the customary way to the Bourdon-tube spring by a pivoted link. Such result will not be the case in my construction, as the contact pin attached to the arm of the sector can freely move in the slot of the spring terminal, and is always held in contact on one and the same side of the slot by the action of the hair spring.

I am aware that changes may be made in the arrangements of the various parts, as well as in the details of construction thereof, without departing from the scope of my present invention; hence I do not wish to be limited to the exact arrangements of the parts herein shown and described, as obvious modifications will suggest themselves to those skilled in the art.

I believe that I am the first to use a multiplying device which is in no way connected to the measuring spring, and therefore desire to claim it broadly.

I claim:

1. In a pressure gage, the combination of a Bourdon-tube provided with a terminal having a flat face extending transversely of said tube, and multiplying mechanism comprising a sector provided with adjustable means adapted to be adjusted transversely of said tube across the face of said terminal, said adjustable means resting against and adapted to be operated by the terminal of said tube to move said sector.

2. In a pressure gage, the combination of a Bourdon-tube provided with a terminal having a flat face extending transversely of said tube, a spring-actuated pinion wheel and pointer, a sector having teeth on its periphery engaging said pinion and adjustable means carried by said sector and engaging the flat face of the terminal of said tube, whereby movement of said terminal determines the travel of the pointer.

3. In a pressure gage, the combination of a Bourdon-tube provided with a terminal having a flat face extending transversely of said tube, a pointer, a spring for turning said pointer in one direction, a multiplying sector adapted to be turned by said tube, for turning said pointer in the opposite direction and winding up said spring and adjustable means connected to said sector and in sliding contact with the flat face of the terminal of said tube for transmitting the movements of said tube to said pointer.

4. In a pressure gage, the combination of a Bourdon-tube provided with a terminal having a flat face extending transversely of said tube, a pointer, a spring adapted to turn said pointer in one direction, a multiplying sector operatively connected to said pointer and provided with an arm extending past the terminal of said tube and an adjustable member on said arm adapted to contact with the flat face of the terminal of said tube, so that movement of the latter in one direction will move said pointer in the opposite direction to the action of said spring.

5. In a pressure gage, the combination of a Bourdon-tube provided with a slotted terminal, the flat faces of which extend transversely of said tube, a pointer, a spring for turning said pointer in one direction, a multiplying sector adapted to be turned by said tube for turning said pointer in the opposite direction and winding up said spring and an arm extending from said sector provided with an adjustable member adapted to contact with the faces of and slide in said slotted terminal for transmitting the movement of said tube to said pointer.

This specification signed and witnessed this 6th day of October, 1910.

ADELBERT O. BENECKE.

Witnesses:
    CLAUDE E. BEZANSON,
    CHAS. E. SKELTON.